United States Patent Office 3,408,329
Patented Oct. 29, 1968

3,408,329
**PROCESS FOR THE PREPARATION OF PHENO-
THIOPLASTS COMPRISING THE REACTION OF
PHENOLS WITH DITHIOLPOLYTHIOETHERS**
Yves Labat, Gelos, France, assignor to Societe Nationale
des Petroles d'Aquitaine, Paris, France
No Drawing. Filed Apr. 12, 1966, Ser. No. 541,972
Claims priority, application France, Apr. 13, 1965,
12,940, Patent 1,440,026
7 Claims. (Cl. 260—48)

ABSTRACT OF THE DISCLOSURE

There is provided an improved process for preparing phenoplasts from phenols and dithiolpolythioethers. The improvement in the novel process resides in the continuous introduction of the dithiolpolythioether into a stirred molten mass of phenol previously activated by the addition of a basic substance.

---

The invention relates to an improved process for the preparation of phenoplasts which contain combined sulphur, in the form of $CH_2S$ groups. It also covers the new sulphur phenoplasts with an increased sulphur content which can be obtained by this process.

One method of producing phenothioplasts was described in the French Patent No. 1,406,482. This prior process consists in causing a phenol to react with a dithiolpolythioether between 45° and 180° C.; it leads to phenoplasts which can contain up to 40% by weight of sulphur.

This process and the phenothioplasts are disclosed and claimed in my co-pending application Ser. No. 426,429, filed Jan. 18, 1965.

The present invention provides certain improvements in the aforementioned process, these improvement enabling the same conversion rate of the phenol to be obtained in a shorter time, while avoiding the homopolymerisation of the dithiopolythioether; it is also possible with this process to work at a fixed temperature, from one end of the condensation to the other, and to maintain the reaction mass in a suitable state of fluidity, which is a condition for good homogeneity. Furthermore, the improved process makes it possible to obtain phenothioplasts of which the content by weight of sulphur may reach 45%, whereas the upper limit did not exceed 40% in respect of the products described in the aforementioned patent; with the improved process, it is possible to obtain phenothioplasts which have certain improved properties, particularly an improved volume or surface electric resistivity.

The process according to the invention consists in continuously introducing dithiolpolythioether into the stirred molten mass of a phenol previously activated by addition of a basic substance, the speed of introduction of the dithiolpolythioether being sufficiently slow for the dithiolpolythioether to be combined with the phenol in proportion as it enters the reaction mass.

In practice, according to one particular embodiment of the invention, the dithiolpolythioethers employed are of the $HS(CH_2S)_nH$ type, in which the number $n$ of groups is generally between 2 and 7. These dithiolpolythioethers are preferably liquid oligomers which are more or less viscous at normal temperature. One particularly convenient form of the invention consists in using liquid oligomers in which $n$ has a value from 3 to 4 and of which the molecular weight is in the region of 190.

In the same way as in the manufacture of phenolformaldehyde condensation products, different phenols can be used, but particularly those of which the ortho and/or para positions are free, i.e. unsubstituted phenols. Thus, phenols such as hydroxybenzene, metacresol, paracresol alkylated phenols, for example, those of which the alkyl radical contains 2 to 4 carbon atoms, resorcinol, etc., are suitable for carrying out the present invention.

It is possible in practice to condense variable quantities of dithiopolythioether or phenol; these quantities may be very small, especially 0.1 mol to 1 mol of phenol; or they may even reach 1.5 mols and more of oligomer to 1 mol of phenol.

One important feature of the present invention consists in the previous incorporation into the phenol of one or more initiators which are formed by basic substances capable of reacting or being associated with the phenol: compounds such as sodium or potassium hydrosulphide, aliphatic secondary amines, cyclic amines, in which the amine function forms part of a heterocyclic ring, for example, morpholine, piperidine, pyrrolidine, etc.; alkali phenates or any basic substances capable of forming a basic phenate with the phenol can also be used. This characteristic of the invention resides in the previous activation of the phenol; the basic initiator, instead of being added directly to the mixture of phenol and dithiolpolythioether, is first of all incorporated into the phenol for activating the latter. It is only after this activation that he oligomer is inroduced into the molten phenol.

According to another important feature, the addition of the dithiolpolythioether to the activated phenol takes place coninuously. The interest of this feature is that it permits the process to be carried out industrially under better conditions than those permitted by the previously described process. In actual fact, the operations are facilitated as a result of a homogenisation of the reaction mass. The condensation, instead of taking place suddenly, is progressive. In the process according to the present invention, the condensation is carried out at constant temperature, this representing a saving of energy with respect to the process in which it is necessary to cool the reaction mass when adding thereto a fresh portion of dithiolpolythioether in order to avoid the homopolymerisation of the latter.

According to one preferred procedure, the first step is to melt the phenol at about 45°; a proportion of initiator which is generally between 0.01 and 0.2, or better still 0.025 to 0.075 mol, per mol of phenol, is added thereto. As indicated above, this initiator can be taken from a wide range of basic products; however, if the economic point of view and the ease of manipulation are considered, excellent results are obtained with diethylamine. There is no point in increasing the proportion of catalyst; a larger quantity leads to a violent reaction which is difficult to control, while a smaller quantity gives a too low phenol conversion rate. After the initiator has been added to and mixed with the pheonol, the temperature is raised to the condensation temperature and the continuous addition of the dithiolpolythioether while stirring is commenced.

The phenol shall be in excess in order to absorb the oligomer as it is introduced and to avoid the homopolymerisation of this latter; this condition is satisfied by the new process.

Hitherto, the best moulding powders have been obtained with molar ratios between phenol and oligomer equal to 1. These resins, which can be easily ground, are still sufficiently fluid under heat in order to be capable of being used in the form of moulding powders.

It is obviously of interest to be able to combine the phenol present to the maximum extent. The period of incorporation of the oligomer and the reaction temperature have a great influence on the conversion rate of the phenol, as will be seen from the examples and the tables given later in the present specification. Nevertheless, the condensation reaction between oligomer and phenol must be stopped when 85 to 90% of the phenol have reacted, because there is formation of a heat-set resin which solidifies in the reactor if this limit is exceeded.

The influence of the period of incorporation of the oligomer into the activated phenol is shown in the following manner: for the same reaction temperature, the rate of conversion of the phenol is smaller when the period of incorporation is shorter, that is to say, the speed of introduction of the dithiopolythioether is greater.

For a same period of incorporation of the oligomer into the activated phenol, the rate of conversion of the phenol is smaller as the temperature is lower.

Nevertheless, it is not desirable to work at too high temperatures, because a too rapid reaction causes the thermosetting of the resin before it has been possible to complete the introduction of all the proposed quantity of oligomer.

In a particular case of the condensation of the phenol (hydroxybenzene) with dithiolpolythioethers of which the number of —$CH_2S$— groups per molecule is 3 to 4, the times for the continuous introduction of 1 mol of this compound into 1 mol of activated phenol are generally about 120 to 210 minutes and especially 140 to 180 minutes, at temperatures which are between 140° and 180° C. Actually, the process according to the invention can be carried out at temperatures which are between the melting point and the boiling point of the phenol, i.e. between 42° C. and 181° C. in the case of hydroxybenzene. However, the best results are obtained between 155° and 165° C.

As in many other manufacturing processes, the capacity of the reactor and the nature of its walls have an influence on the reaction velocity. Thus, when using a stainless steel reactor with a capacity of 5 litres, instead of a 1-litre Pyrex vessel, it is possible to reduce the proportions of initiator and to shorten the time required for introducing the dithiopolythioether in order to obtain the same conversion rate of the phenol with the same initial materials. The stirring also plays a part.

This is the reason why the data given in the present specification regarding the proportions of initiator and the times involved in adding the oligomer have a non-absolute relative significance and can easily be adapted by the person skilled in the art for each particular case.

The condensation of the dithiolpolythioether $$HS(CH_2S)_nH$$

with the phenols proceeds as if the terminal mercaptan functions reacted with the active hydrogen atoms of the phenol in order to liberate $H_2S$. The condensation chain can be set out diagrammatically as follows:

$$(OH—C_6H_4—(CH_2S)_{n-1}CH_2)_x—C_6H_4—OH$$

in which $n$ varies from 3 to 4 in the oligomer being used and $x$ is variable, according to the degree of condensation. However, this reaction mechanism is certainly not the only one to be used throughout the incorporation of the oligomer, because the sulphur contents which are obtained in operating the present process cannot be explained simply by the increase in $x$.

The percentage of S would be:

22% where $x=1$ and $n=3$.
28.5% where $x=1$ and $n=4$.
32% where $x$ is infinite and $n=3$.
39.5% where $x$ is infinite and $n=4$.

It must be accepted that other reactions take place simultaneously, the mechanism of which is not completely explained: more or less strong homopolymerisation reaction with condensation, or formation of some three-dimensional lattices.

When the operations are carried out in the manner described, resins are obtained which comprise an acetone-soluble portion and an acetone-insoluble portion. In the case where 1 mol of oligomer is used to 1 of phenol, the first of these fractions generally has sulphur contents of the order of 30 to 45%, and the second of 40 to 55%, the proportion of sulphur always being higher in the insoluble portion. The industrial product is formed by the combining of these resins, to which are generally added fillers, in accordance with known processes.

A number of non-limiting examples are given below in order to illustrate the invention.

These examples show the influence of the nature and the quantity of the initiator, the period during which the oligomer is incorporated, the reaction temperature and the nature of the reactor, these influences having an effect on the conversion rate of the phenol.

EXAMPLES 1 to 6

Influence of the nature of the initiator.—188 g. of phenol (2 mols) are brought to melting point in a 3-necked glass reactor equipped with a stirrer device, a reflux condenser, a nitrogen supply tube and a thioformaldehyde oligomer inlet. 0.075 mol of the selected initiator in dry form are added at 45° C. under stirring. The temperature is raised progressively to 155–160° C. (and even 170° C. when morphaline is used as catalyst), and 1 mol of oligomer is continuously incorporated in 85 minutes, while stirring the contents of the reactor. The phenol in excess is then distilled in vacuo.

The working conditions and results are set out in Table I:

TABLE I

| Example No. | Initiator | Temperature, ° C. | Conversion Percent of phenol |
|---|---|---|---|
| 1 | Morpholine | 165–170 | 54 |
| 2 | Diethanolamine | 155–160 | 47 |
| 3 | Diethylamine | 155–160 | 68 |
| 4 | Sodium phenate | 155–160 | 68.7 |
| 5 | NaSH | 155–160 | 75 |
| 6 | Pyrrolidine | 155–160 | 83 |

Pyrrolidine is the initiator giving the best results as regards the rate of conversion of the phenol but it is an expensive product.

Sodium hydrosulphide gives good results, but requires careful adjustment of the temperature. Although slightly less active, diethylamine represents the initiator which is particularly suitable in practice.

EXAMPLES 7 to 12

Influence of various parameters—temperature, speed of incorporation of the oligomer, molar proportions of oligomer with respect to phenol.

Using the same reactor as in the preceding examples, 188 g. of phenol (2 mols) are brought to melting point. At 45° C., the dry initiator is added. The temperature is progressively raised to 155–165° C. The desired quantity of oligomer is then introduced continuously into the phenol over a predetermined period. The uncombined phenol is then eliminated by distillation.

Table II shows the influence of these different parameters on the rate of conversion of phenol, using diethylamine as catalyst.

TABLE II

| Examples | 7 | 8 | 9 | 10 | 11 | 12 |
|---|---|---|---|---|---|---|
| Mol of initiator per mol of phenol | 0.075 | 0.075 | 0.075 | 0.075 | 0.0375 | 0.025 |
| Mols of phenol | 2 | 2 | 2 | 2 | 2 | 2 |
| Mols of oligomers | 2 | 2 | 2 | 2,250 | 1.5 | 2 |
| Time of incorporation of the oligomer | 135' | 175' | 175' | 190' | 145' | 175' |
| Condensation, temperature °C | 155–160 | 155–160 | 140–145 | 155–160 | 160–165 | 160–165 |
| Conversion rate of the phenol, percent | 79 | 84.9 | 80.5 | 87 | 82 | 71 |

The influence of the different working factors is quite clear from a comparison between the different examples, particularly Examples 7 and 8—variation of the time for incorporation of the oligomer; better result for a longer time.

Examples 8 and 9—variation of the condensation temperature; optimum at about 155–160° C.

Examples 8 and 10—variation of the proportion of oligomer.

Examples 11 and 12—the proportion of initiator would advantageously be higher than 0.03 mol per mol of phenol.

EXAMPLES 13 and 14

The 1-litre Pyrex reactor is replaced by a 5-litre stainless steel reactor. In order to obtain an equal phenol conversion rate and for the same temperature of 155–160° C., it is sufficient to use a smaller proportion of the initiator, which is diethylamine.

TABLE III

| Examples | 13 | 14 |
|---|---|---|
| Mol of initiator per mol of phenol | 0.0375 | 0.0375 |
| Phenol, mols | 16 | 16 |
| Oligomer, mols | 16 | 8 |
| Time of incorporation of the oligomer | 165' | 85' |
| Phenol conversion rate, percent | 84 | 67 |

It is seen that, in Example 13, there is obtained almost the same conversion as Example 8 with half as much initiator. The same comparison applies as regards Examples 14 and 3.

EXAMPLES 15 to 19

These examples illustrate synthesis reactions of resins, starting with 1 mol of phenol to 1 mol of oligomer, leading to moulding powders which can be easily used. The results are set out in Table IV.

I claim:

1. In the process of producing phenothioplasts by condensing a phenol with dithiolpolythioether in the presence of a basic substance capable of reacting or being associated with phenol admixed with the reaction mixture and acting as initiator, the improvement which consists in:
    (a) first melting the phenol at about 45° C. and adding to it 0.01 to 0.2 mole of the basic initiator per mole of phenol under stirring;
    (b) raising the temperature of the melt not higher than 180° C.;
    (c) introducing in a continuous manner, into the melt, 0.1 to 1.5 moles of a dithiolpolythioether having the general formula $HS(CH_2S)_nH$ wherein $n$ is 2 to 7, at such a rate that the dithiolpolythioether is completely condensed with the phenol in proportion as it is introduced into the melt;
    (d) and stopping the operation when up to 85–90% of the initial phenol has reacted;
    (e) and then removing the non-combined phenol by distillation from the reaction medium.

2. Process according to claim 1, wherein said basic initiator is an amine.

3. Process according to claim 2, wherein said amine is morpholine, diethanolamine, diethylamine, pyrrolidine or piperidine.

4. Process according to claim 1, wherein said basic initiator is sodium phenate or sodium hydrosulfide.

5. Process according to claim 1, wherein the temperature of the melting, during the introduction of the dithiolpolythioether is in the range of 140° to 180° C.

6. Process according to claim 5, wherein said phenol is hydroxybenzene, cresol, ethyl-phenol, propyl-phenol, butyl-phenol or resorcinol.

TABLE IV

| Examples | 15 | 16 | 17 | 18 | 19 |
|---|---|---|---|---|---|
| Nature of initiator | NaSH | Morpholine | Diethylamine | Diethylamine | Pyrrolidine |
| Mol of initiator per mol of phenol | 0.05 | 0.055 | 0.0750 | 0.0375 | 0.02 |
| Time of incorporation of the oligomer | 145' | 165' | 165' | 165' | 145' |
| Condensation, Temperature °C | 150–160 | 170–175 | 155–160 | 155–160 | 150–160 |
| Phenol conversion rate, percent | 76 | 85 | 84 | 84 | 80.5 |
| Reactor, type | Pyrex | Pyrex | Pyrex | Stainless steel | Pyrex |
| Capacity in litres | 1 | 1 | 1 | 5 | 1 |
| Sulphur in percent in the resin obtained | 43.6 | 42.4 | 45 | 42.2 | 43 |
| Sulphur in percent in the acetone-soluble fraction | 37.6 | 40.6 | 41.5 | 40 | 35 |
| Sulphur in percent in the acetone-insoluble fraction | 47.1 | 47.4 | 51 | 48 | 46.2 |

EXAMPLE 20

The ground resins, obtained in Examples 15 to 19, mixed with 10% of hexamethylene tetramine, were moulded at 160° C. Moulded elements were obtained having electrical characteristics which are improved by comparison with those of known phenoplasts; in particular, a resistivity of $10^{15}$ ohm cm.

7. Process according to claim 5, wherein the time of introducing the dithiolpolythioether is 120 to 210 minutes.

No references cited.

WILLIAM H. SHORT, *Primary Examiner.*

HOWARD SCHAIN, *Assistant Examiner.*